United States Patent [19]

Graham

[11] 4,168,840

[45] Sep. 25, 1979

[54] MOTOR VEHICLE LEVEL CONTROL CIRCUIT

[75] Inventor: Donald E. Graham, Centerville, Ohio

[73] Assignee: General Motors Corporation, Detroit, Mich.

[21] Appl. No.: 889,966

[22] Filed: Mar. 24, 1978

[51] Int. Cl.² .......................................... B60G 17/00
[52] U.S. Cl. ................................ 280/6 R; 267/65 D; 280/707
[58] Field of Search .............. 280/6 R, 6 H, 6.1, 6.11, 280/707; 267/65 D, DIG. 1, DIG. 2; 307/9, 10 R

[56] References Cited

U.S. PATENT DOCUMENTS

| 3,584,893 | 6/1971 | Tuczek | 280/707 |
| 4,017,099 | 4/1977 | Hegel | 280/707 |

FOREIGN PATENT DOCUMENTS 1377885  12/1974  United Kingdom ................. 280/6 R

OTHER PUBLICATIONS

Society of Automotive Engineers 770396, "Electronic Sensing for Vehicle Height Control", by R. Hegel, M. Bethell, and R. Sorensen, Feb. 28-Mar. 4, 1977.

*Primary Examiner*—Joseph F. Peters, Jr.
*Assistant Examiner*—John A. Carroll
*Attorney, Agent, or Firm*—Richard G. Stahr

[57] ABSTRACT

An optical switching arrangement including at least one light source connected in a cyclically completed and interrupted electrical energizing circuit and a pair of photosensitive signal generating devices optically coupled thereto through a shuttering arrangement operated by the sprung mass of a motor vehicle produces, when the sprung mass is above and below a predetermined trim band, respective first and second logic signal pairs, each of which is stored until the next different pair is produced. Electrical circuitry responsive to these logic signal pairs produces respective sprung mass high and low signals to which a leveling system is responsive to level the sprung mass within the predetermined trim band. Respective accumulator circuits accumulate the time each of the sprung mass high and low signals is present to effect the inhibiting of the production of each of these signals at the conclusion of a respective predetermined period of time and each is reset to zero upon each occurrence of the opposite one of these signals.

4 Claims, 9 Drawing Figures

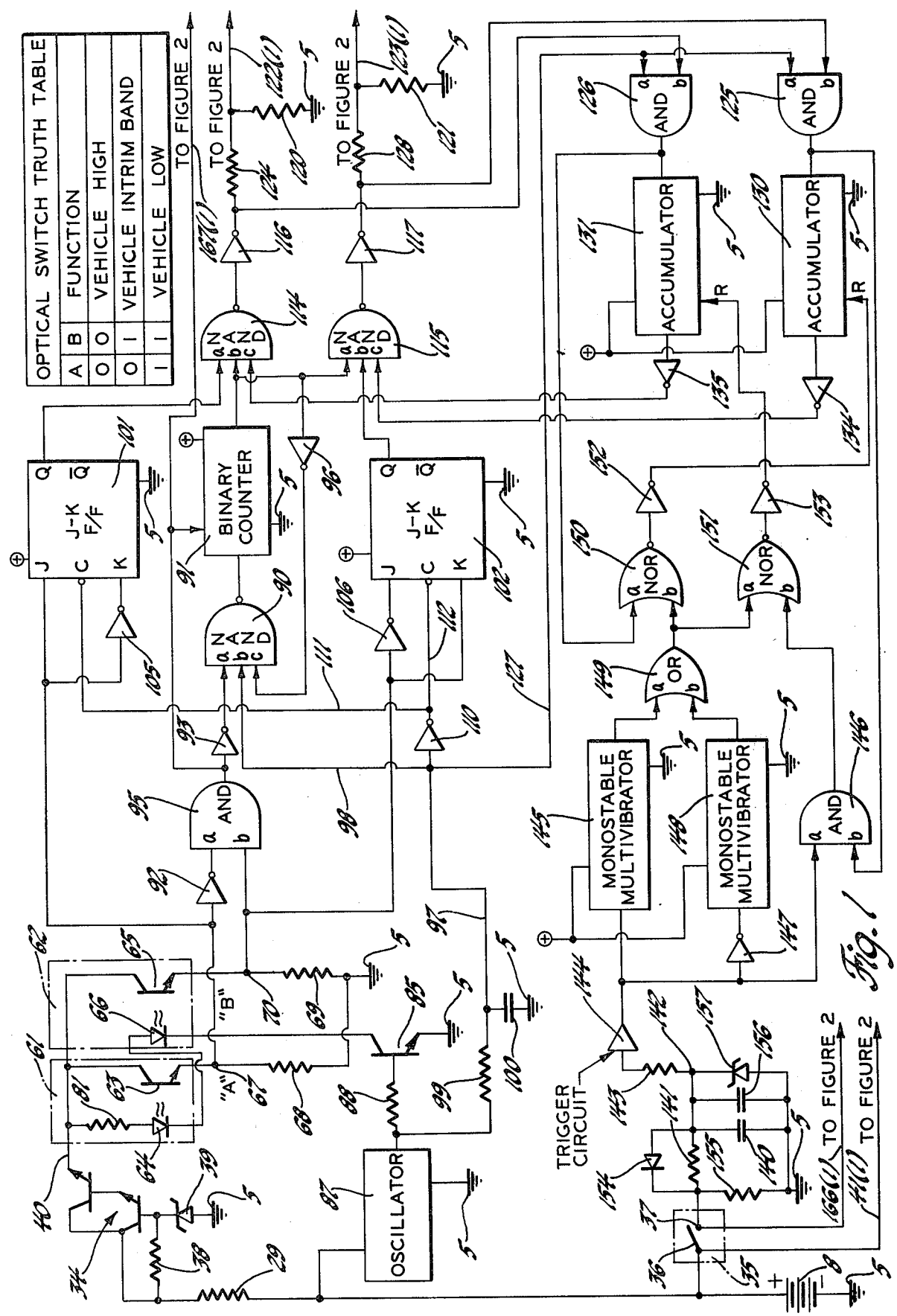

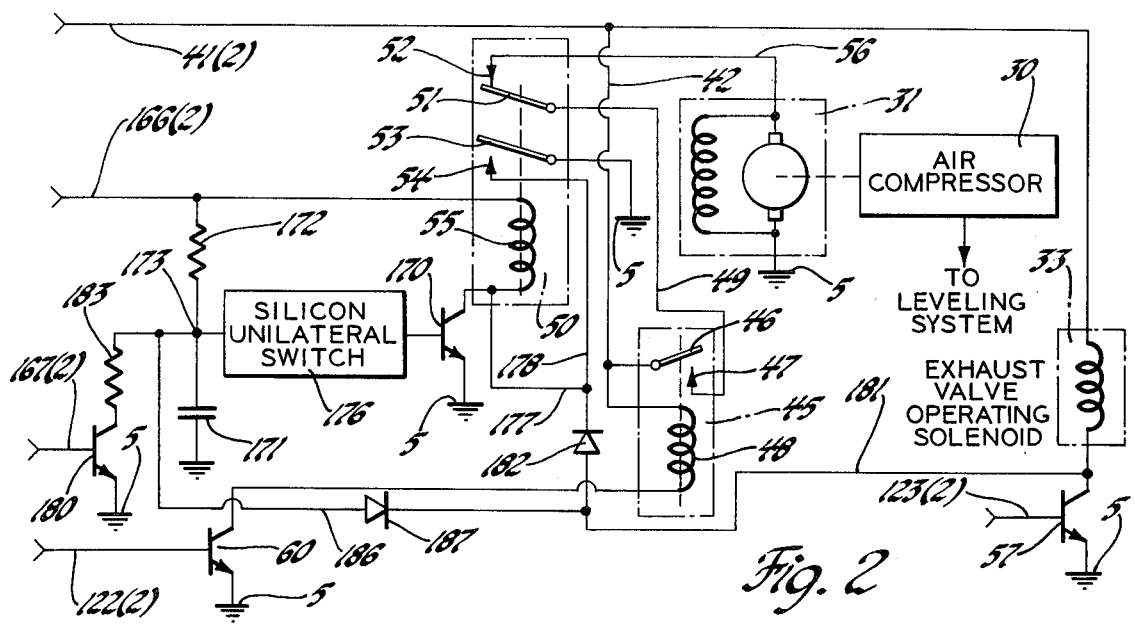
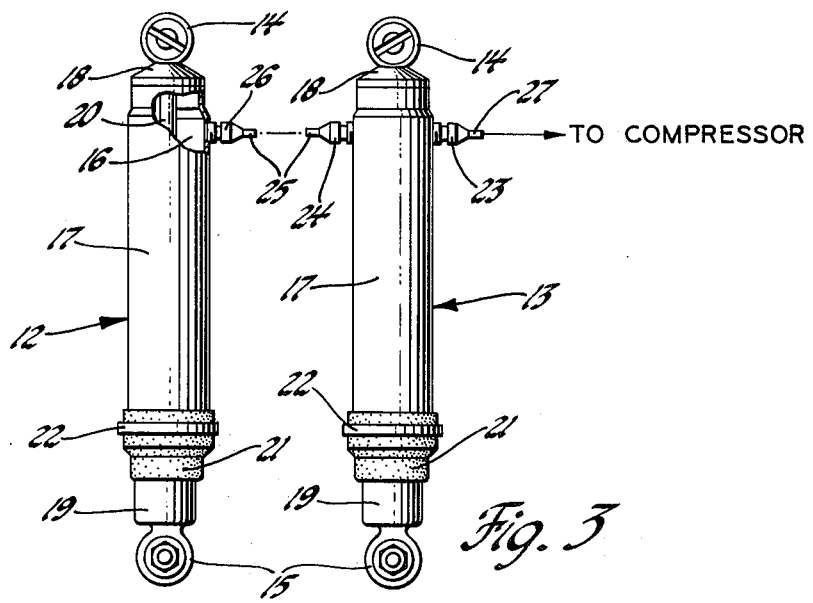
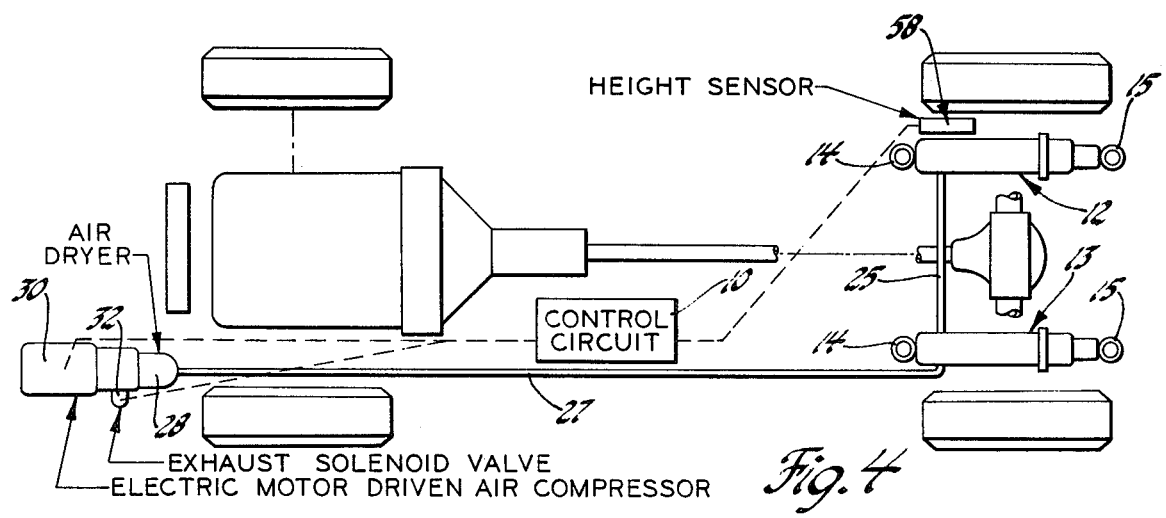

MOTOR VEHICLE LEVEL CONTROL CIRCUIT

This invention relates to electronic control circuits and, more specifically, to a motor vehicle level control circuit for use with motor vehicle leveling systems of the type operative to level the sprung mass of a motor vehicle within a predetermined trim band.

As is well known in the automotive art, the sprung mass of the modern motor vehicle comprises the frame and body and associated components which are spring connected to the unsprung mass of the motor vehicle usually including the wheels, drive train and front and rear axles. To maintain the sprung mass of the motor vehicle within a predetermined trim band as the vehicle load is increased or decreased, automatic electrically operated vehicle leveling systems are frequently employed. That is, the vehicle leveling systems maintain a predetermined height relationship between the sprung and unsprung masses with changes of vehicle load.

With some applications of this type, an optical switching arrangement of the type including at least one light source connected in a light source electrical energizing circuit and a pair of photosensitive signal generating devices optically coupled thereto through a movable shuttering arrangement operated by the sprung mass is employed for producing respective logic signal pairs when the sprung mass is above the trim band, is within the trim band and is below the trim band. As it is desirable that the leveling system operate to level the vehicle unsprung mass within the trim band at all times including those during which the automotive ignition switch is "Off", battery power to the optical switching arrangement, to the control circuitry and to the leveling system is maintained at all times. To reduce battery drain, it is particularly important that the optical switching arrangement light source energizing circuit be designed to provide the necessary logic signal pairs and also to effect a minimum battery drain.

It is, therefore, an object of this invention to provide an improved motor vehicle level control circuit.

It is another object of this invention to provide an improved motor vehicle level control circuit for use with motor vehicle leveling systems of the type operative to level the sprung mass of the motor vehicle within a predetermined trim band in response to respective logic signal pairs indicating the sprung mass of the motor vehicle to be above and below the trim band.

It is another object of this invention to provide an improved motor vehicle level control circuit for use with motor vehicle leveling systems of the type operative to level the sprung mass of the motor vehicle within a predetermined trim band and includes electronic delay circuitry which prevents vehicle sprung mass level correction with normal road movements.

It is another object of this invention to provide an improved motor vehicle level control circuit for use with motor vehicle leveling systems of the type operative to level the sprung mass of the motor vehicle within a predetermined trim band in response to respective sprung mass high and sprung mass low electrical signals indicating the sprung mass of the motor vehicle to be above and below the trim band and includes respective accumulator circuitry responsive to the sprung mass high signals and to the sprung mass low signals for inhibiting the production thereof at the conclusion of respective predetermined time periods.

It is another object of this invention to provide an improved motor vehicle level control circuit for use with motor vehicle leveling systems of the type operative to level the sprung mass of the motor vehicle within a predetermined trim band wherein an optical switching arrangement of the type including at least one light source connected in a cyclically completed and interrupted electrical energizing circuit and a pair of photosensitive electrical signal generating devices optically coupled thereto produces respective logic signal pairs when the sprung mass of the motor vehicle is above the trim band, is within the trim band and is below the trim band.

It is another object of this invention to provide an improved motor vehicle level control circuit for use with motor vehicle leveling systems of the type operative to level the sprung mass of the motor vehicle within a predetermined trim band that includes an optical switching arrangement including at least one light source connected in a cyclically completed and interrupted electrical energizing circuit and a pair of photosensitive signal generating devices optically coupled thereto through a shuttering arrangement operated by the vehicle sprung mass for producing respective logic signal pairs when the sprung mass ia above and below a predetermined trim band and circuitry for preventing a false indication of the position of the sprung mass during those periods of time the light source energizing circuit is interrupted.

It is an additional object of this invention to provide an improved motor vehicle level control circuit for use with motor vehicle leveling systems of the type operative to level the sprung mass of the motor vehicle within a predetermined trim band wherein an optical switching arrangement including at least one light source connected in a cyclically completed and interrupted electrical energizing circuit and a pair of photosensitive signal generating devices optically coupled thereto through a shuttering arrangement operated by the vehicle sprung mass produces respective logic signal pairs when the vehicle sprung mass is above and below the trim band and electrical circuitry responsive thereto produces respective system responsive discrete sprung mass high and low signals which, at the termination of a predetermined total period of time each is present, are inhibited from being further produced in response to output signals produced by respective accumulator circuits, each of which is reset to zero upon the occurrence of the opposite one of these signals.

It is a further object of this invention to provide an improved motor vehicle level control circuit for use with motor vehicle leveling systems of the type operative to level the sprung mass of the motor vehicle within a predetermined trim band in response to respective electrical signals indicating the sprung mass of the motor vehicle to be above and below the trim band and includes fail-safe circuitry which, at the termination of a predetermined period of time is effective to disable the level control system.

In accordance with this invention, a motor vehicle level control circuit for use with motor vehicle leveling systems of the type operative to level the sprung mass of the motor vehicle within a predetermined trim band in response to respective sprung mass high and sprung mass low signals is provided wherein an optical switching arrangement including at least one light source connected in a cyclically completed and interrupted electrical energizing circuit and a pair of photosensitive signal generating devices optically coupled thereto through a shuttering arrangement operated by the vehicle sprung mass produces respective logic signal pairs when the vehicle sprung mass is above and below the trim band and electrical circuitry responsive thereto produces the system responsive discrete sprung mass high and low signals which, at the termination of a predetermined total period of time each is present, are inhibited from being further produced in response to output signals produced by respective accumulator circuits, each of which is reset to zero upon each occurrence of the opposite one of these signals.

For a better understanding of the present invention, together with additional objects, advantages and features thereof, reference is made to the following description and accompanying drawing in which:

FIG. 1 sets forth the motor vehicle leveling control circuit of this invention partially in schematic and partially in block form;

FIG. 2 sets forth schematically the portion of an associated motor vehicle leveling system controlled by the output signals of the control circuit of FIG. 1 and fail-safe circuitry that disables the control circuit upon the termination of a predetermined period of time;

FIG. 3 illustrates a pair of auxiliary load supporting fluid springs of the type normally used with a motor vehicle leveling system;

FIG. 4 illustrates generally in schematic form a modern motor vehicle leveling system;

Figure 5:
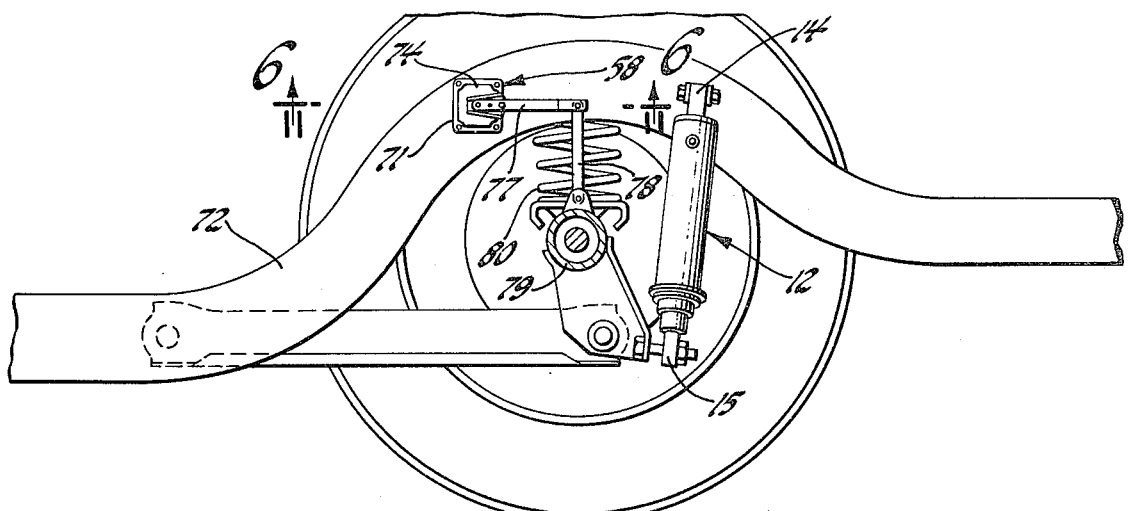
FIG. 5 illustrates in detail one method of mounting a sprung mass height sensor on a motor vehicle.

Throughout the several FIGURES of the drawing, like elements have been assigned like characters of reference and, in FIGS. 1 and 2, point of reference or ground potential has been indicated by the accepted schematic symbol and referenced by the numeral 5.

In the interest of reducing drawing complexity, specific electrical connections between the source of operating potential and several of the various circuit elements are not shown in the drawing. It is to be specifically understood, however, that all of these elements are supplied with rated operating potential. For others of the various circuit elements of the drawing, the source of operating potential is schematically represented as a plus sign (+) within a circle.

Referring to FIG. 3 of the drawing, a pair of combination shock absorber and air spring units 12 and 13 of the type suitable for use with a motor vehicle leveling system is illustrated. Each of these combination shock absorber and air spring units 12 annd 13 includes a top end mount assembly 14 and a bottom end mount assembly 15. The top end mount assembly 14 is adapted to be connected to the frame of a motor vehicle which, along with the body, represents the motor vehicle sprung mass and the bottom end mount assembly 15 is adapted to be connected to a suitable portion of the rear suspension assembly which represents the motor vehicle unsprung mass. Units 12 and 13 represent auxiliary load supporting devices which, in association with primary load supporting springs, maintain a predetermined curb height between the vehicle body and the axle housing when the vehicle is unloaded. To maintain this predetermined curb height or any other predetermined height relationship, the vehicle leveling system is operated to vary the pressure in a variable volume pressurizable pressure fluid chamber 16 of each of units 12 and 13 formed between a dust tube 17 closed at its upper end by a cap 18 and an outer shock absorber cylinder 19. In the illustrated arrangement, the combination shock absorber and air spring unit includes a piston rod 20. The pressurizable fluid chamber 16 is closed by a flexible sleeve 21 that has one end thereof fastened to the open lower end of dust tube 17 by a clamp ring 22 and the opposite end thereof secured to the outer periphery of shock absorber cylinder 19 by a like clamp ring, not shown. The pressurizable fluid chamber 16 of the unit 13 has an inlet fitting 23 therefor and an outlet fitting 24 that is joined by a crossover tube 25 to an inlet fitting 26 to the pressurizable fluid chamber 16 of the unit 12. A common exhaust and supply conduit 27 has one end thereof connected to inlet fitting 23 and the opposite end thereof connected to an air dryer 28, FIG. 4, interconnected with the outlet valve, not shown, of an electric motor driven air compressor 30. The electric motor driven air compressor 30 may be any of the many air compressors driven by a direct current electric motor well known in the art. The air compressor 30 direct current driving motor is schematically represented in FIG. 2 and referenced by the numeral 31. It is only necessary that a normally closed solenoid operated valve 32 in communication with the exhaust and supply conduit 27 be provided.

FIG. 4 schematically represents a motor vehicle leveling system with which the control circuit of this invention may be employed. As leveling systems of this type are well known in the art, a detailed description thereof is not necessary for this specification which is directed to the control circuit which provides the output signals to which the system illustrated in FIG. 4 is responsive to maintain the sprung mass of a motor vehicle within a predetermined trim band. The electronic control circuit of this invention is represented in block form in FIG. 4 and referenced by the numeral 10.

Operating potential for both the motor vehicle leveling system of FIG. 4 and the motor vehicle level control circuit of this invention, to be later explained in detail, may be supplied by a conventional automotive type storage battery 8, schematically illustrated in FIG. 1. The positive polarity output terminal of battery 8 is connected directly to movable contact 36 of an electrical switch 35 also having a stationary contact 37. Electrical switch 35 may be a normally open pair of contacts of a conventional automotive type ignition switch, such as the accessory or ignition circuit contacts, which are maintained in the electrical circuit closed position while the engine of an associated automotive vehicle is in the "Run" mode. As automotive type ignition switches are well known in the art, a detailed description thereof is not required for this specification. If desirable, electrical switch 35 may be any one of the many normally open, single pole-single throw electrical switches well known in the art. The potential of battery 8 is also applied through a current limiting resistor 29 and a conventional series pass type voltage regulator circuit including NPN transistor Darlington pair 34, resistor 38 and Zener diode 39. The series pass voltage regulator circuit regulates battery 8 potential to a predetermined magnitude, for example 8 volts direct current, which appears across positive polarity potential lead 40 and point of reference or ground potential 5.

An energizing circuit for direct current motor 31 adapted to drive air compressor 30 in any conventional or convenient manner may be traced from the positive polarity output terminal of battery 8 of FIG. 1, through lead 41(1) of FIG. 1, leads 41(2) and 42 of FIG. 2, the normally open contact pair, movable contact 46 and stationary contact 47 of relay 45, lead 49, the normally closed contact pair, movable contact 51 and stationary contact 52, of failure mode relay 50, lead 56, direct current motor 31 and point of reference or ground potential 5 to the negative polarity output terminal of battery 8. An energizing circuit for the operating solenoid 33 of normally closed solenoid operated exhaust valve 32 may be traced from the positive polarity output terminal of battery 8 of FIG. 1, through lead 41(1) of FIG. 1, lead 41(2) of FIG. 2, operating solenoid 33 of solenoid operated exhaust valve 32, the collector-emitter electrodes of NPN transistor 57 and point of reference or ground potential 5 to the negative polarity output terminal of battery 8. An energizing circuit for operating coil 48 of electrical relay 45 may be traced from the positive polarity output terminal of battery 8 of FIG. 1 through lead 41(1) of FIG. 1, leads 41(2) and 42 of FIG. 2, operating coil 48 of electric relay 45, the collector-emitter electrodes of NPN transistor 60 and point of reference or ground potential 5 to the negative polarity output terminal of battery 8. It is pointed out that these three energizing circuits are connected across battery 8 at all times. Upon the application of an electrical signal to the base electrode of NPN transistor 60 in the proper polarity relationship to produce base-emitter drive current through an NPN transistor, NPN transistor 60 conducts through the collector-emitter electrodes thereof to complete the previously described energizing circuit for operating coil 48 of electrical relay 45. Upon the application of an electrical signal to the base electrode of NPN transistor 57 in the proper polarity relationship to produce base-emitter drive current through an NPN transistor, NPN transistor 57 conducts through the collector-emitter electrodes thereof to complete the previously described energizing circuit for the operating solenoid 33 of normally closed solenoid operated exhaust valve 32. Should the motor vehicle sprung mass be above the preselected trim band, an electrical sprung mass high control signal of a positive polarity with respect to point of reference or ground potential 5 applied to the base electrode of NPN transistor 57 is effective to complete the previously described energizing circuit for the operating solenoid 33 of normally closed solenoid operated exhaust valve 32 which opens this valve to decrease the pressure within variable volume pressurizable fluid chamber 16 of each of combination shock absorber and air spring units 12 and 13 of FIG. 3 to lower the motor vehicle sprung mass. Should the motor vehicle sprung mass be below the preselected trim band, an electrical sprung mass low control signal of a positive polarity with respect to point of reference or ground potential 5 applied to the base electrode of NPN transistor 60 is effective to complete the previously described energizing circuit for operating coil 48 of relay 45 and, consequently, the previously described energizing circuit for direct current motor 31 adapted to drive air compressor 30 to increase the pressure within the variable volume pressurizable fluid chamber 16 of each of combination shock absorber and air spring units 12 and 13 to raise the motor vehicle sprung mass. From this description, it is apparent that the motor vehicle leveling system of FIG. 4 is of the type operative to level the motor vehicle sprung mass within a predetermined trim band in response to respective electrical signals indicating the motor vehicle sprung mass to be above and below the trim band. The motor vehicle level control circuit of this invention is operative to produce the electrical signals to which the leveling system is responsive to level the sprung mass of the motor vehicle within the trim band. In a practical application of the control circuit of this invention, the trim band is of a width of 0.625 of an inch.

Figure 6:
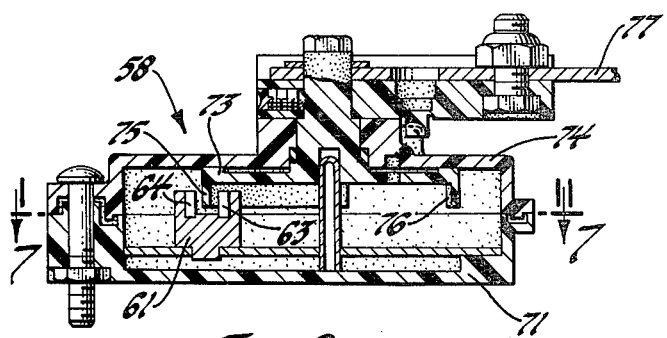
FIG. 6 is a section view of the height sensor of FIG. 5 taken along line 6—6 and looking in the direction of the arrows.

To produce a logic signal pair when the sprung mass of the motor vehicle is above the trim band, another logic signal pair when the sprung mass of the motor vehicle is within the trim band and another logic signal pair when the sprung mass of the motor vehicle is below the trim band, a pair of optical switch units 61 and 62, FIGS. 1, 6 and 7, may be employed. Optical switch units suitable for this application are commercially available items, examples of which are the type H13A1 marketed by the General Electric Company and the type TIXL143 marketed by Texas Instruments. The optical switch units 61 and 62 are self-contained, optical switch 61 having a phototransistor 63 arranged to be light coupled to a corresponding light-emitting diode 64 and optical switch 62 having a phototransistor 65 arranged to be light coupled to a corresponding light-emitting diode 66.

As is well known in the art, a phototransistor properly electrically poled for forward conduction is triggered conductive through the current carrying electrodes thereof when exposed to light. Phototransistors 63 and 65 of respective optical switches 61 and 62 are connected in parallel across positive polarity potential lead 40 and point of reference or ground potential 5 through respective resistors 68 and 69. As the collector electrode of each of these devices is connected to positive polarity potential lead 40 and the emitter electrode of each of these devices is connected to point of reference or ground potential 5 through respective resistors 68 and 69, these devices are properly electrically poled for forward conduction.

In the practical application of the control circuit of this invention, a light shuttering arrangement is employed wherein a light shutter is positioned in a manner to be rotated between phototransistor 63 and corresponding light-emitting diode 64 of optical switch 61 and another light shutter is positioned in a manner to be rotated between phototransistor 65 and corresponding light-emitting diode 66 of optical switch 61. In a manner to be later explained, the light shuttering arrangement employed is operative to shield phototransistor 63 of optical switch 61 from corresponding light-emitting diode 64 and to shield phototransistor 65 of optical switch 62 from corresponding light-emitting diode 66 while the sprung mass of the motor vehicle is above the trim band; to shield phototransistor 63 of optical switch 61 from corresponding light-emitting diode 64 and to expose phototransistor 65 of optical switch 62 to the light emitted by corresponding light-emitting diode 66 when the sprung mass of the vehicle is within the trim band and to expose phototransistor 63 of optical switch 61 to the light emitted by corresponding light-emitting diode 64 and to expose phototransistor 65 of optical switch 62 to the light emitted by corresponding light-emitting diode 66 when the sprung mass of the motor vehicle is below the trim band. While phototransistor 63 is exposed to the light emitted by corresponding light-emitting diode 64, this device conducts through the collector-emitter electrodes and an electrical potential signal appears across resistor 68 of a positive polarity upon junction 67 with respect to point of reference or ground potential 5 and while phototransistor 65 is exposed to the light emitted by corresponding light-emitting diode 66, this device conducts through the collector-emitter electrodes and an electrical potential signal appears across resistor 69 of a positive polarity upon junction 70 with respect to point of reference or ground potential 5. For purposes of easy identification, the output logic signals of the phototransistor and light-emitting diode combination 63-64 will be referred to as the "A" signals and the output logic signals of the phototransistor and light-emitting diode combination 65-66 will be referred to as the "B" signals. In accordance with logic terminology well known in the art, throughout this specification these logic signals will be referred to as being in the "High" or logic 1 state or in the "Low" or logic 0 state. For purposes of this specification, and without intention or inference of a limitation thereto, the "High" or logic 1 signals will be considered to be of a positive polarity potential and the "Low" or logic 0 signals will be considered to be of zero or ground potential. The truth table for the "A" and "B" signals produced by the optical switch pair 61-62 with the shuttering arrangement of the practical application is set forth in FIG. 1 wherein it is indicated that the optical switch pair 61-62 produces a 0-0 logic signal pair when the sprung mass of the motor vehicle is above the trim band, a 0-1 logic signal pair when the sprung mass of the motor vehicle is within the trim band and a 1-1 logic signal pair when the sprung mass of the motor vehicle is below the trim band. The optical switch pair 61-62, therefore, produces respective logic signal pairs when the sprung mass of the motor vehicle is above the trim band, is within the trim band and is below the trim band.

Figure 7B:
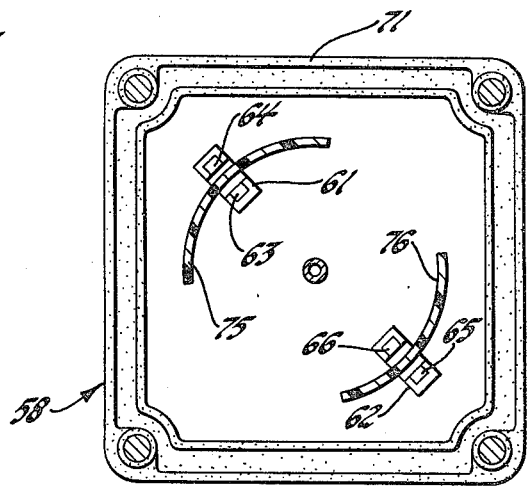
FIGS. 7A, 7B and 7C are section views of the height sensor of FIG. 6, taken along line 7—7 and looking in the direction of the arrows when the sprung mass is high, in trim and low, respectively.
Figure 7A:
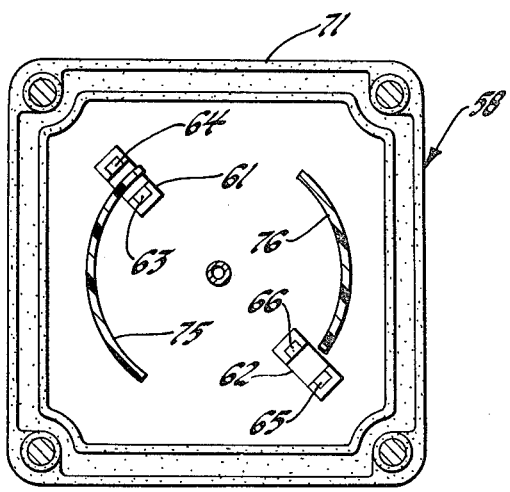
Figure 7C:
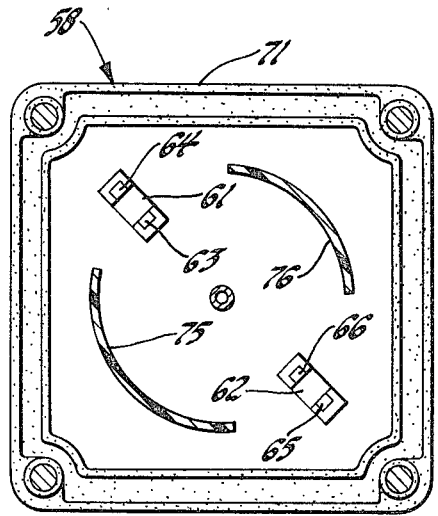

FIG. 5 illustrates one method for mounting a height sensor generally shown at 58 upon a motor vehicle. Contained within housing 71 rigidly mounted upon the vehicle frame 72 in any suitable manner are the two optical switch units 61 and 62, best shown in FIGS. 6, 7A, 7B and 7C, and a rotor member 73 rotatably mounted within the cover 74 of housing 71. Rotor member 73 includes a first shutter portion 75 arranged to be passed between phototransistor 63 and corresponding light-emitting diode 64 of optical switch 61 and a second shutter portion 76 arranged to be passed between phototransistor 65 and corresponding light-emitting diode 66 of optical switch 62, as best seen in FIGS. 7A, 7B and 7C. Rotor member 73 is arranged to be rotatable by lever member 77 secured to the portion of the hub of rotor member 73 extending outside housing cover 74. The end of lever member 77 opposite the hub of rotor member 73 is connected to one end of another lever member 78, the opposite end of which is rigidly secured to the vehicle rear axle housing 79. The motor vehicle frame portion of the vehicle sprung mass is connected to the rear axle housing 79 of the vehicle unsprung mass by a conventional spring 80, as is well known in the automotive art.

Housing member 71 and lever members 77 and 78 are so located and proportioned relative to each other that: (1) when the vehicle sprung mass is within the trim band, shutter member 75 shields phototransistor 63 of optical switch 61 from the light emitted by corresponding light-emitting diode 64 and phototransistor 65 of optical switch 62 is exposed to the light emitted by corresponding light-emitting diode 66, as best shown in FIG. 7A; (2) when the sprung mass rises above the trim band, rotor member 73 is rotated in a clockwise direction whereby shutter member 75 is rotated to a position between phototransistor 63 and corresponding light-emitting diode 64 of optical switch 61 and shutter member 76 is rotated to a position between phototransistor 65 and corresponding light-emitting diode 66 of optical switch 62, as best shown in FIG. 7B; and (3) when the sprung mass depresses below the trim band, rotor member 73 is rotated in a counterclockwise direction whereby shutter member 75 is rotated to a position at which it is not between phototransistor 63 and corresponding light-emitting diode 64 of optical switch 61 and shutter member 76 is rotated to a position at which it is not between phototransistor 65 and corresponding light-emitting diode 66 of optical switch 62, as best shown in FIG. 7C. The optical switch pair 61-62, therefore, produces a 0-1 logic signal pair when the vehicle sprung mass is within the trim band, a 0-0 logic signal pair when the vehicle sprung mass is high and a 1-1 logic signal pair when the vehicle sprung mass is low.

A particular advantage realized by use of the novel circuit of this invention is the significant reduction of battery 8 current drain. To accomplish this desirable feature, light-emitting diodes 64 and 66 of respective optical switches 61 and 62 are connected in series across positive polarity potential lead 40 and point of reference or ground potential 5 through current limiting resistor 81 and the collector-emitter electrodes of an NPN transistor 85. The output signals of a conventional constant frequency oscillator circuit 87 operatively connected across the positive polarity output terminal of battery 8 and point of reference or ground potential 5 are applied through resistor 88 to the base electrode of NPN transistor 85 in the proper polarity relationship to provide base-emitter drive current through an NPN transistor. Consequently, upon the occurrence of each output signal pulse of oscillator circuit 87, transistor 85 is rendered conductive through the collector-emitter electrodes to complete an energizing circuit for series connected light-emitting diodes 64 and 66 across positive polarity potential lead 40 and point of reference or ground potential 5. As oscillator circuit 87 may be any of the many constant frequency oscillator circuits well known in the art, it has been illustrated in FIG. 1 in block form. It is only necessary that oscillator circuit 87 produce a series of output signal pulses of a short duration separated by periods of long duration. In the practical application of the circuit of this invention, the width of each output signal pulse of oscillator circuit 87 is 1% of the period between oscillator pulses. That is, oscillator circuit 87 has a 1% duty cycle.

From this description, it is apparent that optical switches 61 and 62 in conjunction with height sensor 58 comprise an optical switching arrangement of the type including at least one light source connected in a light source electrical energization circuit and a pair of photosensitive signal generating devices optically coupled to the light source through a movable shuttering arrangement operated by the motor vehicle sprung mass for producing respective logic signal pairs when the sprung mass is above the trim band, is within the trim band and is below the trim band and that the light source energizing circuit is cyclically completed and interrupted at predetermined intervals whereby the light source energizing circuit current drain upon battery 8 on an average basis is reduced by an amount equal to the ratio of the period of interruption to the period of completion thereof. That is, with oscillator circuit 87 having a 1% duty cycle and assuming the energizing current for series connected light-emitting diodes 64 and 66 to be 40 milliamperes, the current drain of the light-emitting diode energizing circuit on battery 8 on an average basis is reduced to 0.4 milliamperes.

In a manner to be later explained in detail, other circuitry of the control circuit of this invention is responsive to the logic signal pair produced by the optical switching arrangement when the sprung mass of the motor vehicle is above the trim band to produce a sprung mass high signal for effecting the lowering of the sprung mass and to the logic signal pair produced by the optical switching arrangement when the sprung mass of the motor vehicle is below the trim band to produce a sprung mass low signal for effecting the raising of the sprung mass. To prevent unnecessary leveling system operation with normal road movement as the sprung mass of the motor vehicle bounds and rebounds out of and into the trim band with normal highway driving conditions, circuitry for delaying the production of the vehicle sprung mass high and vehicle sprung mass low signals for a predetermined delay period is provided. The delay period introduced by this circuitry insures that the leveling system is energized only when the sprung mass of the vehicle is loaded enough that it is displaced below the trim band or is unloaded sufficiently that it is displaced above the trim band for a period of time longer than the predetermined delay period. The circuitry for providing the predetermined delay period includes a binary counter circuit 91 arranged to count the output signal pulses of oscillator circuit 87 when gated through conventional NAND gate 90 in a manner to be later explained in detail. In the practical application, binary counter circuit 91 is a commercially available 14-stage binary counter circuit marketed by Motorola Semiconductor Products, Inc. under the designation MC14020. Binary counter circuit 91 divides the oscillator circuit 87 output frequency with the $n^{th}$ stage frequency being the operating frequency of the oscillator divided by $2^n$. Buffered outputs are available from stages 1, and 4 through 14. A logic 1 output appears upon the output terminal of one of the stages corresponding to the count of the oscillator signals. In the preferred embodiment, the predetermined delay period during which the production of the sprung mass high and sprung mass low signals is inhibited is 8 seconds. Consequently, oscillator circuit 87 is designed to have an operating frequency of 128 cycles per second and the $2^{10}$ output terminal of binary counter circuit 91 is utilized. That is, counting signals of a frequency of 128 cycles per second, the 14-stage binary counter circuit 91 reaches a count of 1,024 or $2^{10}$ in 8 seconds.

When the sprung mass of the motor vehicle is within the trim band, the aforementioned light shuttering arrangement is so operated that phototransistor 63 is light shielded from corresponding light-emitting diode 64 and phototransistor 65 is exposed to the light emitted from corresponding light-emitting diode 66, as best seen in FIG. 7A. Consequently, each time an oscillator circuit 87 output signal pulse triggers NPN transistor 85 conductive through the collector-emitter electrodes thereof to complete the previously described energizing circuit for light-emitting diodes 64 and 66, a logic 0 signal appears upon junction 67 and a logic 1 signal appears upon junction 70, the 0-1 logic signal pair produced by the optical switch pair 61-62 while the sprung mass of the motor vehicle is within the trim band. The logic 0 signal present upon junction 67 is inverted by a conventional inverter circuit 92 to a logic 1 signal that is applied to the "a" input terminal of a conventional AND gate 95 and the logic 1 signal present upon junction 70 is applied to the "b" input terminal of AND gate 95. With a logic 1 signal present upon each the "a" and "b" input terminals thereof, AND gate 95 produces a logic 1 output signal that is applied as a reset signal to the R reset input terminal of binary counter circuit 91 to reset this device to zero and is inverted by a conventional inverter circuit 93 to a logic 0 signal that is applied to the "a" input terminal of conventional NAND gate 90. Although the output signal pulses of oscillator circuit 87 are applied to the "b" input terminal of NAND gate 90 through resistor 99 and leads 97 and 98, in response to the logic 0 signal present upon the "a" input terminal thereof, NAND gate 90 maintains a logic 1 signal upon the output terminal thereof regardless of the polarity of the signals applied to the other two input terminals. Consequently, the oscillator circuit 87 output signal pulses are not gated through NAND gate 90 to binary counter circuit 91. The oscillator circuit 87 output signal pulses, therefore, are not counted by binary counter circuit 91 while the sprung mass of the motor vehicle is within the trim band.

When the sprung mass of the motor vehicle rises out of the trim band to a position above or higher than the trim band, the aforementioned light shuttering arrangement is so operated that both phototransistors 63 and 65 are light shielded from the corresponding respective light-emitting diodes 64 and 66, as best seen in FIG. 7B. Consequently, each time an oscillator circuit 87 output signal pulse triggers NPN transistor 85 conductive through the collector-emitter electrodes thereof to complete the previously described energizing circuit for light-emitting diodes 64 and 66, a logic 0 signal appears upon both junctions 67 and 70, the 0-0 logic signal pair produced by the optical switch pair 61-62 while the sprung mass of the motor vehicle is higher than the trim band. The logic 0 signal present upon junction 67 is inverted by inverter circuit 92 to a logic 1 signal that is applied to the "a" input terminal of AND gate 95 and the logic 0 signal present upon junction 70 is applied to the "b" input terminal of AND gate 95. With a logic 0 signal present upon the "b" input terminal thereof, AND gate 95 produces a logic 0 output signal that is inverted by inverter circuit 93 to a logic 1 signal that is applied to the "a" input terminal of NAND gate 90. As binary counter circuit 91 is in the reset condition, a logic 0 signal is present upon the $2^{10}$ output terminal thereof that is inverted by conventional inverter circuit 96 to a logic 1 signal that is applied to the "c" input terminal of NAND gate 90. With a logic 1 signal present upon both the "a" and "c" input terminals thereof, NAND gate 90 is enabled to gate the oscillator circuit 87 output signal pulses therethrough to binary counter circuit 91. Consequently, while the sprung mass of the motor vehicle is higher than the trim band, binary counter circuit 91 counts each of the oscillator circuit 87 output signal pulses. At the termination of the predetermined delay period, in the actual embodiment eight seconds, when binary counter circuit 91 has counted 1,024 oscillator circuit 87 output signal pulses, a logic 1 enabling signal appears upon the $2^{10}$ output terminal thereof.

When the sprung mass of the motor vehicle lowers out of the trim band to a position below or lower than the trim band, the aforementioned light shuttering arrangement is so operated that both phototransistors 63 and 65 are exposed to the light emitted by the corresponding light-emitting diodes 64 and 66, as best seen in FIG. 7C. Consequently, each time an oscillator circuit 87 output signal pulse triggers NPN transistor 85 conductive through the collector-emitter electrodes thereof to complete the previously described energizing circuit for light-emitting diodes 64 and 66, a logic 1 signal appears upon both junctions 67 and 70, the 1-1 logic signal pair produced by the optical switch pair 61-62 while the sprung mass of the motor vehicle is lower than the trim band. The logic 1 output signal present upon junction 67 is inverted by inverter circuit 92 to a logic 0 signal that is applied to the "a" input terminal of AND gate 95 and the logic 1 signal present upon junction 70 is applied to the "b" input terminal of AND gate 95. With a logic 0 signal present upon the "a" input terminal thereof, AND gate 95 produces a logic 0 output signal that is inverted by inverter circuit 93 to a logic 1 signal that is applied to the "a" input terminal of NAND gate 90. As binary counter circuit 91 is in the reset condition, a logic 0 signal is present upon the $2^{10}$ output terminal thereof that is inverted by inverter circuit 96 to a logic 1 signal that is applied to the "c" input terminal of NAND gate 90. With a logic 1 signal present upon both the "a" and "c" input terminals thereof, NAND gate 90 is enabled to gate the oscillator circuit 87 output signal pulses therethrough to binary counter circuit 91. Consequently, while the sprung mass of the motor vehicle is lower than the trim band, binary counter circuit 91 counts each of the oscillator circuit 87 output signal pulses. At the termination of the predetermined delay period, in the actual embodiment eight seconds, when binary counter circuit 91 has counted 1,024 oscillator circuit 87 output signal pulses, a logic 1 enabling signal appears upon the $2^{10}$ output terminal thereof.

Binary counter circuit 91, therefore, produces an enabling signal a predetermined period of time after the production of either the 0-0 or 1-1 logic signal pairs.

As the energizing circuit for light-emitting diodes 64 and 66 is cyclically completed and interrupted by the oscillator circuit 87 and NPN transistor 85 combination, during those periods of time the energizing circuit for light-emitting diodes 64 and 66 is interrupted, a logic 0 signal is present upon both junctions 67 and 70. To prevent a false indication of the position of the sprung mass of the motor vehicle during those periods of time the light source energizing circuit is interrupted, circuitry is provided for storing a selected one and the inverse of the other one of the two signals of the logic signal pair last produced during a period of completion of the light source energizing circuit until replaced by the selected one and the inverse of the other one of the two signals of the next different logic signal pair produced during a period of completion of the light source energizing circuit. In the actual embodiment, conventional J-K flip-flop circuits 101 and 102 are employed for this purpose.

The J-K flip-flop circuit is a logic memory element well known in the art that yields a predictable output for every possible combination of pulse inputs. Depending upon the type J-K flip-flop considered, upon the positive or the negative transition of each clock pulse applied to the C clock pulse input terminal thereof: (1) with no signal applied to either the J or K input terminals, the J-K flip-flop circuit remains in its pre-existing state; (2) with a logic 1 signal applied to the J input terminal and a logic 0 signal applied to the K input terminal, it is triggered to the "Set" state in which a logic 1 signal appears upon the Q output terminal and a logic 0 signal appears upon the $\overline{Q}$ output terminal; (3) with a logic 0 signal applied to the J input terminal and a logic 1 signal applied to the K input terminal, it is triggered to the "Reset" state in which a logic 0 appears upon the Q output terminal and a logic 1 signal appears upon the $\overline{Q}$ output terminal and, (4) with logic 1 signals simultaneously applied to both the J and K input terminals, the state of the component reverses from the state that previously existed the application of the clock pulse. As J-K flip-flop circuits are commercially available circuit elements well known in the digital data process art, J-K flip-flop circuits 101 and 102 have been illustrated in block form in the drawing. One example of a commercially available J-K flip-flop circuit suitable for use with the circuit of this invention is a type 74C107 marketed by the National Semiconductor Corporation.

As the J-K flip-flop circuits employed in the actual embodiment are responsive to the fall of the clock pulses to trigger the device from either state to the other, the output signal pulses of oscillator circuit 87 are inverted by a conventional inverter circuit 110 and applied to the C clock input terminal of each of J-K flip-flop circuits 101 and 102 through respective leads 111 and 112.

To insure that the oscillator circuit 87 output signal pulses applied to the "b" input terminal of NAND gate 90 and the inverted oscillator circuit 87 output signal pulses applied to the C clock input terminal of each of J-K flip-flop circuits 101 and 102 are so applied after the logic signal pair produced upon junctions 67 and 70 during each period of completion of the energizing circuit light-emitting diodes 64 and 66 has stabilized, the combination of resistor 99 and capacitor 100 is provided to introduce a slight delay in the application of these signal pulses to NAND gate 90 and J-K flip-flop circuits 101 and 102. It is necessary, however, that the delay introduced by the resistor 99 and capacitor 100 combination be less than the period of duration of each oscillator 87 output signal pulse to insure that the pulses applied to NAND gate 90 and to J-K flip-flop circuits 101 and 102 are so applied while the valid logic signal pairs are present upon junctions 67 and 70.

When the sprung mass of the motor vehicle is leveled into the trim band from either the sprung mass high or sprung mass low positions, the logic 0 signal present upon junction 67 is inverted by inverter circuit 92 to a logic 1 signal that is applied to the "a" input terminal of AND gate 95 and the logic 1 signal present upon junction 70 is applied to the "b" input terminal of AND gate 95. With a logic 1 signal present upon both input terminals thereof, AND gate 95 produces a logic 1 output signal that is applied as a Reset signal to the R reset input terminal of binary counter circuit 91 to reset this device to zero and is inverted by inverter circuit 93 to a logic 0 signal that is applied to the "a" input terminal of NAND gate 90. Consequently, each time the motor vehicle sprung mass is leveled into the trim band, the previously described circuitry that provides the predetermined delay period is reset to zero. With a logic 0 signal present upon the "a" input terminal thereof, NAND gate 90 produces a logic 1 output signal regardless of the polarity of the signals applied to the other two input terminals, consequently, NAND gate 90 does not gate the oscillator 87 output signal pulses through to binary counter circuit 91. As binary counter circuit 91 does not count the oscillator 87 output signal pulses while the sprung mass of the motor vehicle is within the trim band, the circuitry that provides the predetermined delay period is disabled while the sprung mass of the motor vehicle is within the trim band and a logic 0 signal is maintained upon the $2^{10}$ output terminal of binary counter circuit 91 that is applied to the "b" input terminal of conventional NAND gate 114 and to the "a" input terminal of conventional NAND gate 115. With a logic 0 signal present upon one of the input terminals thereof, each of NAND gates 114 and 115 produces a logic 1 output signal. These logic 1 output signals are inverted by respective conventional inverter circuits 116 and 117 to logic 0 signals across respective resistors 120 and 121. The logic 0 signal across resistor 120 is applied through lead 122(1) of FIG. 1 and lead 122(2) of FIG. 2 to the base electrode of NPN transistor 60 and the logic 0 signal appearing across resistor 121 is applied through lead 123(1) of FIG. 1 and lead 123(2) of FIG. 2 to the base electrode of NPN transistor 57. These logic 0 signals are ineffective to trigger either of NPN transistors 60 or 57, conductive, consequently, neither air compressor motor 31 nor solenoid valve 32 is activated.

Should the motor vehicle be loaded to an extent that the sprung mass lowers to a position lower than the trim band, each time an oscillator circuit 87 output signal pulse triggers NPN transistor 85 conductive through the collector-emitter electrodes to complete the previously described energizing circuit for light-emitting diodes 64 and 66, a logic 1 signal appears upon each of junctions 67 and 70, the 1-1 logic signal pair produced by optical switches 61-62 when the sprung mass of the vehicle is lower than the trim band. The logic 1 signal present upon junction 67 is applied to the J input terminal of J-K flip-flop circuit 101, is inverted to a logic 0 signal by inverter circuit 105 that is applied to the K input terminal of J-K flip-flop 101 and is inverted to a logic 0 signal by inverter circuit 92 that is applied to the "a" input terminal of AND gate 95. The logic 1 signal present upon junction 70 is inverted to a logic 0 signal by inverter circuit 106 that is applied to the J input terminal of J-K flip-flop circuit 102, is applied to the K input terminal of J-K flip-flop circuit 102 and is applied to the "b" input terminal of AND gate 95. With the logic 0 signal applied to the "a" input terminal thereof, AND gate 95 produces a logic 0 output signal, consequently, the previously described circuitry that provides the predetermined delay period is enabled in a manner previously explained and NAND gate 90 gates each delayed output signal pulse of oscillator 87 through to binary counter circuit 91. The delayed oscillator 87 output signal pulses are also inverted by inverter circuit 110 and applied to the C clock input terminal of each of J-K flip-flop circuits 101 and 102. Consequently, the first output signal pulse of oscillator 87 occurring after the 1-1 logic signal pair has been produced upon junctions 67 and 70 is also effective to transfer the logic 1 signal applied to the J input terminal of J-K flip-flop circuit 101 to the Q output terminal and the logic 0 signal applied to the J input terminal of J-K flip-flop circuit 102 to the Q output terminal thereof. Upon this transfer of the signals applied to the J input terminal of each of J-K flip-flop circuits 101 and 102 to the respective Q output terminals, the state of these flip-flop circuits remains unchanged until another different logic signal pair appears upon junction 67 and 70 during a period of completion of the energizing circuit for light-emitting diodes 64 and 66. Although a logic 0 signal is present upon each of junctions 67 and 70 during each period of interruption of the energizing circuit for light-emitting diodes 64 and 66, there is no clock signal applied to J-K flip-flop circuits 101 and 102. Therefore, the one, the "A" signal upon junction 67, and the inverse of the other one, the "B" signal present upon junction 70, of the two signals of the logic signal pair last produced during a period of completion of the energizing circuit for light-emitting diodes 64 and 66 is stored in respective J-K flip-flop circuits 101 and 102 until replaced by the selected one and the inverse of the other one of the two signals of the next different logic signal pair produced during a period of completion of the light source energizing circuit. While binary counter circuit 91 is counting the oscillator 87 output signal pulses up to 1,024 counts, a logic 0 signal is present upon the $2^{10}$ output terminal that is applied to the "b" input terminal NAND gate 114 and to the "a" input terminal of NAND gate 115. Consequently, during this period of time, both NAND gates 114 and 115 produce logic 1 output signals that are inverted by respective inverter circuits 116 and 117 to logic 0 signals that are applied through circuitry previously described to the base electrode of respective transistors 60 and 57. During this delay period, therefore, neither the air compressor 30 drive motor 31 nor the solenoid operated exhaust valve 32 is activated. When binary counter circuit 91 reaches a count of 1,024 oscillator circuit 87 output signal pulses, a logic 1 enabling signal appears upon the $2^{10}$ output terminal thereof which is applied to the "b" input terminal of NAND gate 114 and to the "a" input terminal of NAND gate 115. As the logic 0 signal present upon the Q output terminal of J-K flip-flop circuit 102 is applied to the "b" input terminal of NAND gate 115, a logic 1 signal is maintained upon the output terminal thereof, consequently, the solenoid operated exhaust valve 32 remains inactivated. Assuming for the present that a logic 1 signal is present upon the "c" input terminal of NAND gate 114, a logic 1 signal is present upon each of the input terminals thereof as the logic 1 output enabling signal of binary counter circuit 91 is applied to the "b" input terminal and the logic 1 signal present upon the Q output terminal of J-K flip-flop circuit 101 is applied to "a" input terminal. With a logic 1 signal present upon each of the input terminals, NAND gate 114 produces a logic 0 output signal that is inverted by inverter circuit 116 to a logic 1 sprung mass low output signal across resistor 120. This logic 1 sprung mass low output signal is applied through current limiting resistor 124 and lead 122(1) of FIG. 1 and lead 122(2) of FIG. 2 to the base electrode of NPN transistor 60 to trigger this device conductive through the collector-emitter electrodes thereof which establishes the previously described energizing circuit for operating coil 48 of relay 45. Upon the energization of operating coil 48, the normally open contact pair 46-47 of relay 45 is operated electrically closed to complete the previously described energizing circuit for motor 31 that drives air compressor 30. Upon the activation of air compressor 30, the pressure within the variable volume pressurizable fluid chamber 16 of each of combination shock absorber and air spring units 12 and 13 is increased to thereby raise the sprung mass of the motor vehicle. When the sprung mass of the motor vehicle has been raised into the trim band, upon the next completion of the energizing circuit for light-emitting diodes 64 and 66, the optical switch pair 61-62 produces the 0-1 logic signal pair which indicates the sprung mass of the motor vehicle is within the trim band. The logic 0 signal present upon junction 67 is applied to the J input terminal of J-K flip-flop circuit 101, is inverted to a logic 1 signal by inverter circuit 105 that is applied to the K input terminal of J-K flip-flop 101 and is inverted to a logic 1 signal by inverter circuit 92 that is applied to the "a" input terminal of AND gate 95. The logic 1 signal present upon junction 70 is inverted to a logic 0 signal by inverter circuit 106 that is applied to the J input terminal of J-K flip-flop circuit 102, is applied to the K input terminal of J-K flip-flop circuit 102 and is applied to the "b" input terminal of AND gate 95. With the logic 1 signal applied to both the "a" and "b" input terminals thereof, AND gate 95 produces a logic 1 output signal to reset binary counter circuit 91 of the previously described circuitry that provides the predetermined delay period and disables this circuitry in a manner previously explained. As the delayed oscillator 87 output signal pulses that are inverted by inverter circuit 110 are applied to the C clock input terminal of each of J-K flip-flop circuits 101 and 102, the first output signal pulse of oscillator 87 occurring after the 0-1 logic signal pair has been produced upon junctions 67 and 70 is effective to transfer the logic 0 signal applied to the J input terminal of J-K flip-flop circuit 101 to the Q output terminal and the logic 0 signal applied to the J input terminal of J-K flip-flop circuit 102 to the Q output terminal thereof. Upon this transfer of the signals applied to the J input terminal of each of J-K flip-flop circuits 101 and 102 to the respective Q output terminals, the state of these flip-flop circuits remains unchanged until another different logic signal pair appears upon junctions 67 and 70 during a period of completion of the energizing circuit for light-emitting diodes 64 and 66. Although a logic 0 signal is present upon each of junctions 67 and 70 during each period of interruption of the energizing circuit for light-emitting diodes 64 and 66, there is no clock signal applied to J-K flip-flop circuits 101 and 102. In a manner previously described, the control circuit of this invention produces a logic 0 output signal across each of resistors 120 and 121 when the sprung mass is within the trim band. The logic 0 signal across resistor 120 is effective to interrupt the energizing circuit for operating coil 48 of relay 45 which permits the normally open contact pair 46-47 thereof to be operated electrically open to interrupt the energizing circuit for motor 31. Therefore, air compressor 30 is no longer driven by motor 31. Because air compressor 30 is no longer being driven by motor 31, the pressure within the variable volume pressurizable fluid chamber 16 of combination shock absorber and air spring units 12 and 13 is no longer increased and the system stabilizes with the sprung mass of the motor vehicle in the trim band.

Should the motor vehicle be unloaded to an extent that the sprung mass raises to a position higher than the trim band, each time an oscillator circuit 87 output signal pulse triggers NPN transistor 85 conductive through the collector-emitter electrodes to complete the previously described energizing circuit for light-emitting diodes 64 and 66, a logic 0 signal appears upon each of junctions 67 and 70, the 0-0 logic signal pair produced by optical switches 61-62 when the sprung mass of the vehicle is higher than the trim band. Although this same logic signal pair is present upon junctions 67 and 70 during those periods that the energizing circuit for light-emitting diodes 64 and 66 is interrupted, the operation of the circuit is not affected. The logic 0 signal present upon junction 67 is applied to the J input terminal of J-K flip-flop circuit 101, is inverted to a logic 1 signal by inverter circuit 105 that is applied to the K input terminal of J-K flip-flop 101 and is inverted to a logic 1 signal by inverter circuit 92 that is applied to the "a" input terminal of AND gate 95. The logic 0 signal present upon junction 70 is inverted to a logic 1 signal by inverter circuit 106 that is applied to the J input terminal of J-K flip-flop circuit 102, is applied to the K input terminal of J-K flip-flop circuit 102 and is applied to the "b" input terminal of AND gate 95. With the logic 0 signal applied to the "b" input terminal thereof, AND gate 95 produces a logic 0 output signal, consequently, the previously described circuitry that provides the predetermined delay period is enabled in a manner previously explained and NAND gate 90 gates each delayed output signal pulse of oscillator 87 through to binary counter circuit 91. The delayed oscillator 87 output signal pulses are also inverted by inverter circuit 110 and applied to the C clock input terminal of each of J-K flip-flop circuits 101 and 102. Consequently, the first output signal pulse of oscillator 87 occurring after the 0-0 logic signal pair has been produced upon junctions 67 and 70 is effective to transfer the logic 0 signal applied to the J input terminal of J-K flip-flop circuit 101 to the Q output terminal and the logic 1 signal applied to the J input terminal of J-K flip-flop circuit 102 to the Q output terminal thereof. Upon this transfer of the signals applied to the J input terminal of each of J-K flip-flop circuits 101 and 102 to the respective Q output terminals, the state of these flip-flop circuits remains unchanged until another different logic signal pair appears upon junction 67 and 70 during a period of completion of the energizing circuit for light-emitting diodes 64 and 66. While binary counter circuit 91 is counting the oscillator 87 output signal pulses up to 1,024 counts, a logic 0 signal is present upon the $2^{10}$ output terminal that is applied to the "b" input terminal NAND gate 114 and to the "a" input terminal of NAND gate 115. Consequently, during this period of time, both NAND gates 114 and 115 produce logic 1 output signals that are inverted by respective inverter circuits 116 and 117 to logic 0 signals that are applied through circuitry previously described to the base electrode of respective transistors 60 and 57. During this delay period, therefore, neither the air compressor 30 drive motor 31 nor the solenoid operated exhaust valve 32 is activated. When binary counter circuit 91 reaches a count of 1,024 oscillator circuit 87 output signal pulses, a logic 1 enabling signal appears upon the $2^{10}$ output terminal thereof which is applied to the "b" input terminal of NAND gate 114 and to the "a" input terminal of NAND gate 115. As the logic 0 signal present upon the Q output terminal of J-K flip-flop circuit 101 is applied to the "a" input terminal of NAND gate 114, a logic 1 signal is maintained upon the output terminal thereof, consequently, the air compressor 30 drive motor 31 remains inactivated. Assuming for the present that a logic 1 signal is present upon the "c" input terminal of NAND gate 115, a logic 1 signal is present upon each of the input terminals thereof as the logic 1 output enabling signal of binary counter circuit 91 is applied to the "a" input terminal and the logic 1 signal present upon the Q output terminal of J-K flip-flop circuit 102 is applied to "b" input terminal. With a logic 1 signal present upon each of the input terminals, NAND gate 115 produces a logic 0 output signal that is inverted by inverter circuit 117 to a logic 1 sprung mass high output signal across resistor 121. This logic 1 sprung mass high output signal is applied through current limiting resistor 128 and lead 123(1) of FIG. 1 and lead 123(2) of FIG. 2 to the base electrode of NPN transistor 57 to trigger this device conductive through the collector-emitter electrodes thereof which establishes the previously described energizing circuit for operating solenoid 33 of normally closed solenoid operated exhaust valve 32. Upon the energization of operating solenoid 33, normally closed solenoid operated exhaust valve 32 is operated to the open position which reduces the pressure within the variable volume pressurizable fluid chamber 16 of each of combination shock absorber and air sprung units 12 and 13, thereby lowering the sprung mass of the motor vehicle. When the sprung mass of the motor vehicle has been lowered into the trim band, upon the next completion of the energizing circuit for light-emitting diodes 64 and 66, the optical switch pair 61-62 produces the 0-1 logic signal pair which indicates the sprung mass of the motor vehicle is within the trim band. The logic 0 signal present upon junction 67 is applied to the J input terminal of J-K flip circuit 101, is inverted to a logic 1 signal by inverter circuit 105 that is applied to the K input terminal of J-K flip-flop 101 and is inverted to a logic 1 signal by inverter circuit 92 that is applied to the "a" input terminal of AND gate 95. The logic 1 signal present upon junction 70 is inverted to a logic 0 signal by inverter circuit 106 that is applied to the J input terminal of J-K flip-flop circuit 102, is applied to the K input terminal of J-K flip-flop circuit 102 and is applied to the "b" input terminal of AND gate 95. With the logic 1 signal applied to both the "a" and the "b" input terminal thereof, AND gate 95 produces a logic 1 output signal to reset binary counter circuit 91 of the previously described circuitry that provides the predetermined delay period and disables this circuitry in a manner previously explained. As the delayed oscillator 87 output signal pulses that are inverted by inverter circuit 110 are applied to the C clock input terminal of each of J-K flip-flop circuits 101 and 102, the first output signal pulse of oscillator 87 occurring after the 0-1 logic signal pair has been produced upon junctions 67 and 70 is effective to transfer the logic 0 signal applied to the J input terminal of J-K flip-flop circuit 101 to the Q output terminal and the logic 0 signal applied to the J input terminal of J-K flip-flop circuit 102 to the Q output terminal thereof. Upon this transfer of the signals applied to the J input terminal of each of J-K flip-flop circuits 101 and 102 to the respective Q output terminals, the state of these flip-flop circuits remains unchanged until another different logic signal pair appears upon junctions 67 and 70 during a period of completion of the energizing circuit for light-emitting diodes 64 and 66. Although a logic 0 signal is present upon each of junctions 67 and 70 during each period of interruption of the energizing circuit for light-emitting diodes 64 and 66, there is no clock signal applied to J-K flip-flop circuits 101 and 102. In a manner previously described, the control circuit of this invention produces a logic 0 output signal across each of resistors 120 and 121 when the sprung mass is within the trim band. The logic 0 signal across resistor 121 is effective to interrupt the energizing circuit for operating solenoid 33 of normally closed solenoid operated exhaust valve 32, therefore solenoid operated exhaust valve 32 operates closed to prevent further reduction of pressure within the variable volume pressurizable fluid chamber 16 of combination shock absorber and air spring units 12 and 13 and the system stabilizes with the sprung mass of the motor vehicle in the trim band.

From the foregoing description, it is apparent that the combination of oscillator circuit 87 and NPN transistor 85 is effective to cyclically complete and interrupt the light source energizing circuit at predetermined intervals; that to prevent a false indication of the position of the sprung mass during those periods of time the light source energizing circuit is interrupted, the combination of J-K flip-flop circuits 101 and 102 store a selected one and the inverse of the other one of the two signals of the logic signal pair last produced during a period of completion of the light source energizing circuit until replaced by the selected one and the inverse of the other one of the two signals of the next different logic signal pair produced during a period of completion of the light source energizing circuit; that the combination of oscillator circuits 87, AND gate 95, NAND gate 90 and binary counter circuit 91 is effective to produce a logic 1 enabling signal a predetermined period of time after the production of either the vehicle sprung mass high or the vehicle sprung mass low logic signal pairs, that NAND gate 114 and inverter circuit 116 are responsive to the combination of the stored selected one of the two signals of the last produced logic signal pair appearing upon the Q output terminal of J-K flip-flop circuit 101 and the logic 1 enabling signal produced upon the $2^{10}$ output terminal of binary counter circuit 91 to produce a sprung mass low signal across resistor 120; and that NAND gate 115 and inverter circuit 117 are responsive to the combination of the stored inverse of the other one of the two signals of the last produced logic signal pair appearing upon the Q output terminal of J-K flip-flop circuit 102 and the logic 1 enabling signal appearing upon the $2^{10}$ output terminal of binary counter circuit 91 to produce a sprung mass high signal across resistor 121.

To eliminate unnecessary and prolonged operation of the leveling system in the event of a malfunction of the vehicle suspension system or in the event of an external interference which maintains the sprung mass of the motor vehicle above or below the trim band in such a manner that it cannot be corrected by the operation of the leveling system, the motor vehicle level control circuit of this invention includes a feature which provides for control of the associated leveling system only during a predetermined period of time after which the production of the sprung mass high and low signals is inhibited. In the actual embodiment, the period of time each the sprung mass high and low signals is present is accumulated and predetermined period of time was selected to be two minutes and eight seconds. While the logic 1 sprung mass high signal is present across resistor 121, it is applied to "b" input terminal of conventional AND gate 125; while the logic 1 sprung mass low signal is present across resistor 120, it is applied to the "b" input terminal of conventional AND gate 126; and the output signal pulses of oscillator circuit 87 are applied through resistor 99 and leads 97 and 127 to the "a" input terminal of both AND gates 125 and 126. The output terminal of AND gate 125 is applied to the input terminal of an accumulator circuit 130 and the output terminal of AND gate 126 is applied to the input terminal of an accumulator circuit 131. In the actual embodiment, each of accumulator circuits 130 and 131 is a commercially available device marketed by Motorola Semiconductor Products, Inc., as a type MC14020 14-bit binary counter having buffered outputs available from stages 1, and 4 through 14. As the output frequency of oscillator circuit 87 is selected to be 128 cycles per second in the actual embodiment, this oscillator circuit produces 16,384 oscillator 87 output signal pulses, which is $2^{14}$, in two minutes and eight seconds. Consequently, the $2^{14}$ output terminal of each of accumulator circuits 130 and 131 is employed and the output signals appearing thereon are applied through respective conventional inverter circuits 134 and 135 to the "c" input terminal of respective NAND gates 115 and 114. While the logic 1 sprung mass high signal is present across resistor 121, the output signal pulses of oscillator circuit 87 are gated through AND gate 125 to the input terminal of accumulator circuit 130. When a count of 16,384 oscillator circuit 87 output signal pulses has been reached by accumulator circuit 130 in two minutes and eight seconds, a logic 1 signal appears upon the $2^{14}$ output terminal thereof that is inverted by inverter circuit 134 to a logic 0 output signal that is applied to the "c" input terminal of NAND gate 115. With a logic 0 signal upon the "c" input terminal thereof, NAND gate 115 produces a logic 1 output signal regardless of the combination of logic signals present upon the other input terminals "a" and "b" thereof and maintains this logic 1 output signal until accumulator circuit 130 is reset to zero. This logic 1 output signal is inverted by inverter circuit 117 to a logic 0 signal across resistor 121 which is ineffective to operate solenoid operated exhaust valve 32 as previously explained. While the logic 1 sprung mass low signal is present across resistor 120, the output signal pulses of oscillator circuit 87 are gated through AND gate 126 to the input terminal of accumulator circuit 131. When a count of 16,384 oscillator circuit 87 output signal pulses has been reached by accumulator circuit 131 in two minutes and eight seconds, a logic 1 signal appears upon the $2^{14}$ output terminal thereof that is inverted by inverter circuit 135 to a logic 0 output signal that is applied to the "c" input terminal of NAND gate 114. With a logic 0 signal present upon the "c" input terminal thereof, NAND gate 114 produces a logic 1 output signal regardless of the combination of logic signals present upon the other input terminals "a" and "b" thereof and maintains this logic 1 output signal until accumulator circuit 131 is reset to zero. This logic 1 output signal is inverted by inverter circuit 116 to a logic 0 signal across resistor 120 which is ineffective to effect the energization to direct current motor 31 which drives air compressor 30. After the sprung mass high signal has been present across resistor 121 for the predetermined accumulated period of time, two minutes and eight seconds in the actual embodiment, further production of this signal is inhibited by the action of accumulator circuit 130, inverter circuit 134, NAND gate 115 and inverter circuit 117 and after the sprung mass low signal has been present across resistor 120 for the predetermined accumulated period of time, two minutes and eight seconds in the actual embodiment, further production of this signal is inhibited by the action of accumulator circuit 131, inverter circuit 135, NAND gate 114 and inverter circuit 116.

For the control circuit of this invention to be effective thereafter, accumulator circuits 130 and 131 must be reset to zero. As accumulator circuits 130 and 131 accumulate, respectively, the period of time the sprung mass high and the sprung mass low signals are present, it is necessary that these circuits be reset at selected times. In the actual embodiment, accumulator circuits 130 and 131 are both reset each time the electrical switch 35 is turned "On" and turned "Off" and, in addition, each is reset to zero in response to the signal it is not effective to accumulate. That is, accumulator circuit 130 is reset to zero upon each occurrence of a sprung mass low signal and accumulator circuit 131 is reset to zero upon the occurrence of each sprung mass high signal.

When movable contact 36 of electrical switch 35 is operated into electrical circuit closing engagement with stationary contact 37, capacitor 140 charges exponentially across battery 8 through resistor 141. The plate of capacitor 140 that is charged to a positive polarity potential is connected through junction 142 and current limiting resistor 143 to the input terminal of a conventional trigger circuit 144. When the charge upon capacitor 140 reaches the trigger level of trigger circuit 144, this device abruptly switches the output signal thereof from substantially ground potential to a positive polarity potential to produce a substantially square waveform output signal. This logic 1 output signal is applied to the input terminal of a conventional monostable multivibrator circuit 145, to the "a" input terminal of a conventional AND gate 146 and is inverted to a logic 0 signal by conventional inverter circuit 147 that is applied to the input terminal of a conventional monostable multivibrator circuit 148. Consequently, when capacitor 140 has charged to the trigger level of trigger circuit 144, the resulting logic 1 output signal upon junction 142 triggers monostable multivibrator circuit 145 to the alternate state in which a logic 1 signal is present upon the output terminal thereof. This logic 1 output signal is applied to the "a" input terminal of conventional OR gate 149 which, in response thereto, produces a logic 1 output signal that is applied to the "b" input terminal of conventional NOR gate 150 and to the "a" input terminal of conventional NOR gate 151. With a logic 1 signal present upon the "b" input terminal thereof, NOR gate 150 produces a logic 0 output signal that is inverted by conventional inverter circuit 152 to a logic 1 output signal that is applied to the R reset input terminal of accumulator circuit 130 to reset this device to zero. With a logic 1 signal present upon the "a" input terminal thereof, NOR gate 151 produces a logic 0 output signal that is inverted by conventional inverter circuit 153 to a logic 1 output signal that is applied to the R reset input terminal of accumulator circuit 131 to reset this device to zero. Consequently, both accumulator circuits 130 and 131 are reset to zero upon the operation of movable contact 36 of switch 35 into electrical circuit engagement with stationary contact 37. When movable contact 36 is operated out of electrical circuit closing engagement with stationary contact 37, capacitor 140 discharges exponentially through the parallel combination of resistor 141 and diode 154 and series resistor 155. When the charge upon capacitor 140 has reduced to a value below the trigger level of trigger circuit 144, this device abruptly switches the output signal thereof from a positive polarity to substantially ground potential. This logic 0 output signal of trigger circuit 144 is applied to the input terminal of monostable multivibrator circuit 145 and is inverted to a logic 1 signal by inverter circuit 147 that is applied to the input terminal of monostable multivibrator circuit 148. Consequently, when capacitor 140 has discharged below the trigger level of trigger circuit 144, the resulting logic 0 output signal is inverted by inverter circuit 147 to a logic 1 signal that triggers monostable multivibrator circuit 148 to the alternate state in which a logic 1 signal is present upon the output terminal thereof. This logic 1 output signal is applied to the "b" input terminal of OR gate 149 which, in response thereto, produces a logic 1 signal that is applied to the "b" input terminal of NOR gate 150 and to the "a" input terminal of NOR gate 151. With a logic 1 signal present upon the "b" input terminal thereof, NOR gate 150 produces a logic 0 output signal that is inverted by inverter circuit 152 to a logic 1 output signal that is applied to the R reset input terminal of accumulator circuit 130 to reset this device to zero. With a logic 1 signal present upon the "a" input terminal thereof, NOR gate 151 produces a logic 0 output signal that is inverted by inverter circuit 153 to a logic 1 output signal that is applied to the R reset input terminal of accumulator circuit 131 to reset this device to zero, consequently, both accumulator circuits 130 and 131 are reset to zero upon the operation of movable contact 36 of switch 35 out of electrical circuit engagement with stationary contact 37. The one of monostable multivibrator circuits 145 or 148 that is triggered to the alternate state upon the respective closing or opening of contacts 36 and 37 of switch 35 spontaneously reverts to the stable state after a predetermined period of time to condition the circuit to be responsive to the next operation of switch 35. Trigger circuit 144 may be any of the many trigger circuits well known in the art of the type that produces a logic 1 output signal in response to an input signal of a potential level equal to or greater than the selected trigger level thereof and a logic 0 output signal in response to an input signal of a potential level less than the selected trigger level thereof. Capacitor 156 provides transient protection and Zener diode 157 regulates battery 8 potential to a magnitude compatible with the remainder of the circuit, for example 9 volts.

While a sprung mass low signal is present across resistor 120, it is applied as a logic 1 signal to the "b" input terminal of AND gate 126. Upon each occurrence of an oscillator circuit 87 output signal pulse applied to the "a" input terminal of AND gate 126, this device produces a logic 1 output signal that is applied to the "a" input terminal of NOR gate 150. With a logic 1 signal present upon the "a" input terminal thereof, NOR gate 150 produces a logic 0 output signal that is inverted by inverter circuit 152 to a logic 1 output signal that is applied to the R reset input terminal of accumulator circuit 130 to reset this device to zero. While a sprung mass high signal is present across resistor 121, it is applied as a logic 1 signal to the "b" input terminal of AND gate 125. Upon each occurrence of an oscillator circuit 87 output signal pulse applied to the "a" input terminal of AND gate 125, this device produces a logic 1 output signal that is applied to the "b" input terminal of a conventional AND gate 146. While movable contact 36 of switch 35 is in electrical circuit engagement with stationary contact 37 for a period of time long enough for capacitor 140 to charge to a level high enough to trigger buffer amplifier circuit 144 to the state in which it produces a logic 1 output signal that is applied to the "a" input terminal of AND gate 146, this device produces a logic 1 output signal that is applied to the "b" input terminal of NOR gate 151. With a logic 1 signal present upon the "b" input terminal thereof, NOR gate 151 produces a logic 0 output signal that is inverted by inverter circuit 153 to a logic 1 output signal that is applied to the R reset input terminal of accumulator circuit 131 to reset this device to zero. From this description it is apparent that accumulator circuit 130 is reset to zero in response to each sprung mass low signal and that accumulator circuit 131 is reset to zero in response to each sprung mass high signal.

AND gate circuit 146 is included in this circuitry to prevent accumulator 131 from being reset to zero in response to a sprung mass high signal while movable contact 36 of switch 35 is operated out of electrical circuit engagement with stationary contact 37. With this condition of switch 35, a logic 0 signal is applied to the "a" input terminal of AND gate 146, consequently, the AND gate 125 logic 1 output signals are not gated through AND gate 146. Therefore, accumulator circuit 131 is not reset in response to a sprung mass high signal. When the sprung mass low signal has been present for the predetermined accumulated period of time while switch 35 is open, the resulting logic 1 output signal upon the $2^{14}$ output terminal of accumulator circuit 131 inhibits further production of a sprung mass low signal to maintain the sprung mass of the motor vehicle in a position below the trim band until accumulator circuit 131 is reset.

An energizing circuit for operating coil 55 of failure mode relay 50 of FIG. 2 may be traced from stationary contact 37 of electrical switch 35 of FIG. 1, through lead 166(1) of FIG. 1, lead 166(2) of FIG. 2, operating coil 55 of failure mode relay 50, the collector-emitter electrodes of NPN transistor 170 and point of reference or ground potential 5 to the negative polarity output terminal of battery 8. In a manner previously explained, while the sprung mass of the motor vehicle is in a position higher than or in a position lower than the trim band, AND gate 95 of FIG. 1 produces a logic 0 output signal that is applied through lead 167(1) of FIG. 1 and lead 167(2) of FIG. 2 to the base electrode of NPN transistor 180. As this logic 0 signal does not provide base-emitter drive current to NPN transistor 180, this device is not conductive while the sprung mass of the motor vehicle is higher than and lower than the trim band. With these two positions of the sprung mass of the motor vehicle while movable contact 36 of electrical switch 35 of FIG. 1 is closed into electrical contact engagement with stationary contact 37, timing capacitor 171 charges through a circuit which may be traced from the positive polarity output terminal of battery 8, through the closed contacts of electrical switch 35, lead 166(1) of FIG. 1, lead 166(2) of FIG. 2, timing resistor 172, timing capacitor 171 and point of reference or ground potential 5 to the negative polarity output terminal of battery 8. Junction 173 between timing capacitor 171 and timing resistor 172 is connected to the input terminal of a silicon unilateral switch 176 illustrated in FIG. 2 in block form as it may be any one of the many commercially available unilateral switches of this type well known in the art. In the actual embodiment, this silicon unilateral switch is a type 2N4989 commercially marketed by the General Electric Company. When timing capacitor 171 has become charged to the level of the trigger point of silicon unilateral switch 176, silicon unilateral switch 176 conducts to complete a circuit through which base-emitter drive current is supplied to NPN transistor 170. This circuit which may be traced from the positive polarity output terminal of battery 8 of FIG. 1 through the closed contacts of electrical switch 35, lead 166(1) of FIG. 1, lead 166(2) of FIG. 2, timing resistor 172, silicon unilateral switch 176, the base-emitter electrodes of NPN transistor 170 and point of reference or ground potential 5 to the negative polarity output terminal of battery 8. This base-emitter drive current triggers NPN transistor 170 conductive through the collector-emitter electrodes thereof to complete the previously described energizing circuit for operating coil 55 of failure mode relay 50. Upon the completion of this energizing circuit, movable contact 51 of the normally closed contact pair of failure mode relay 50 is operated out of electrical circuit engagement with corresponding stationary contact 52 and movable contact 53 of the normally open contact pair of failure mode relay 50 is operated into electrical circuit engagement with corresponding stationary contact 54. When movable contact 53 is operated into electrical circuit engagement with stationary contact 54, an alternate return path to the negative polarity output terminal of battery 8 is provided for operating coil 55 of failure mode relay 50 through leads 177 and 178, the closed contact pair 53–54 of failure mode relay 50 and point of reference or ground potential 5. Consequently, failure mode relay 50 remains latched in this operated condition until movable contact 36 of electrical switch 35 of FIG. 1 is operated out of electrical circuit engagement with stationary contact 37. While failure mode relay 50 is latched in this operated condition, the energizing circuit previously described for motor 31 that drives air compressor 30 is interrupted by the now open contact pair 51–52 of failure mode relay 50. In addition, an alternate ground return circuit to the negative polarity output terminal of battery 8 for the previously described energizing circuit for operating solenoid 33 of solenoid operated exhaust valve 32 is established through lead 181, diode 182, the now closed contact pair 53–54 of failure mode 50 to point of reference or ground potential 5. Consequently, while failure mode relay 50 is latched in the operated mode, the solenoid operated exhaust valve 32 is maintained open and the motor 31 energizing circuit is maintained interrupted. With the energizing circuit for motor 31 maintained interrupted and the energizing circuit for operating solenoid 33 of solenoid operated exhaust valve 32 maintained energized, the sprung mass of the motor vehicle is lowered into its lowest position and remains in this position until the movable contact 36 of electrical switch 35 of FIG. 1 is operated out of electrical circuit engagement with stationary contact 37. This circuit is provided for the purpose of protecting against a failure of the previously described electrical control circuit which may leave the sprung mass of the motor vehicle in a position higher than the trim band. The values of timing capacitor 171 and timing resistor 172 are selected to provide a predetermined time delay longer than that required for the sprung mass of the motor vehicle to be leveled into the trim band. In the actual embodiment, the timing capacitor 171 and timing resistor 172 combination are selected to have values which will provide a ninety second time delay. As the sprung mass of the motor vehicle should be leveled into the trim band from a position either above or below the trim band in a matter of 45 seconds, the circuit just described does not affect the normal operation of the control circuit.

In a manner previously explained, when the sprung mass of the motor vehicle is within the trim band, AND gate 95 of FIG. 1 produces a logic 1 output signal that is applied through lead 167(1) of FIG. 1 and lead 167(2) of FIG. 2 to the base electrode of NPN transistor 180. This logic 1 signal supplies base-emitter drive current to NPN transistor 180 to trigger this device conductive through the collector-emitter electrodes thereof. While NPN transistor 180 is maintained conductive during those periods of time that the sprung mass of the motor vehicle is within the trim band, charging current is diverted from timing capacitor 171 through resistor 183 and the collector-emitter electrodes of NPN transistor 180. Consequently, this failure mode circuit is maintained in the Reset condition.

During normal operation of the control circuit of this invention, each time NPN transistor 57 of FIG. 2 is triggered conductive in a manner previously explained to complete the energizing circuit for operating solenoid 33 of solenoid operated exhaust valve 32 to lower the sprung mass of the motor vehicle into the trim position from a position higher than the trim position, any charge upon timing capacitor 171 is drained therefrom through lead 186, diode 187, lead 181 and the collector-emitter electrodes of NPN transistor 57.

Diode 182 is included to prevent the pulling in of failure mode relay 50 when transistor 57 is triggered conductive in a manner previously explained and diode 187 is included to prevent a charge from being placed on timing capacitor 171 through leads 181 and 186 during those times that NPN transistor 57 is not conductive.

In the drawing, NPN transistors 57, 60, 85, 170 and 180 have been shown to be single transistors. It is to be specifically understood that selected ones or all of these single transistors may be replaced by transistor Darlington pairs should the quantity of current each is required to conduct dictates that a transistor Darlington pair is required.

While a preferred embodiment of the present invention has been shown and described, it is obvious to one skilled in the art that various modifications and substitutions may be made without departing from the spirit of the invention which is to be limited only within the scope of the appended claims.

What is claimed is:

1. A motor vehicle level control circuit for use with motor vehicle leveling systems of the type operative to level the sprung mass of the motor vehicle within a predetermined trim band in response to respective electrical signals indicating the sprung mass to be above and below the trim band comprising: an optical switching arrangement of the type including at least one light source connected in a light source electrical energizing circuit and a pair of photosensitive signal generating devices optically coupled to said light source through a movable shuttering arrangement operated by said sprung mass for producing a first logic signal pair when the sprung mass is above the trim band and a second different logic signal pair when the sprung mass is below the trim band; means for cyclically completing and interrupting said light source energizing circuit at predetermined intervals whereby the light source energizing circuit current drain on an average basis is reduced by an amount equal to the ratio of the period of interruption to the period of completion; means for preventing a false indication of the position of said sprung mass during those periods of time said light source energizing circuit is interrupted, said means comprising means for storing a selected one and the inverse of the other one of the two signals of the said logic signal pair last produced during a period of completion of said light source energizing circuit until replaced by said selected one and said inverse of the other one of the two signals of the next different said logic signal pair produced during a period of completion of said light source energizing circuit; means for producing an enabling signal a predetermined period of time after the production of either one of said first and second logic signal pairs; first circuit means responsive to the combination of the stored said selected one of said two signals of said last produced logic signal pair and said enabling signal for producing a sprung mass low signal; second circuit means responsive to the combination of the stored said inverse of the other one of said two signals of said last produced logic signal pair and said enabling signal for producing a sprung mass high signal; means responsive to said sprung mass low signal for effecting the raising of said sprung mass; and means responsive to said sprung mass high signal for effecting the lowering of said sprung mass.

2. A motor vehicle level control circuit for use with motor vehicle leveling systems of the type operative to level the sprung mass of the motor vehicle within a predetermined trim band in response to respective electrical signals indicating the sprung mass to be above and below the trim band comprising: an optical switching arrangement of the type including at least one light source connected in a light source electrical energizing circuit and a pair of photosensitive signal generating devices optically coupled to said light source through a movable shuttering arrangement operated by said sprung mass for producing a first logic signal pair when the sprung mass is above the trim band and a second different logic signal pair when the sprung mass is below the trim band; means for cyclically completing and interrupting said light source energizing circuit at predetermined intervals whereby the light source energizing circuit current drain on an average basis is reduced by an amount equal to the ratio of the period of interruption to the period of completion; means for preventing a false indication of the position of said sprung mass during those periods of time said light source energizing circuit is interrupted, said means comprising means for storing a selected one and the inverse of the other one of the two signals of the said logic signal pair last produced during a period of completion of said light source energizing circuit until replaced by said selected one and said inverse of the other one of the two signals of the next different said logic signal pair produced during a period of completion of said light source energizing circuit; means for producing an enabling signal a predetermined period of time after the production of either one of said first and second logic signal pairs; first circuit means responsive to the combination of the stored said selected one of said two signals of said last produced logic signal pair and said enabling signal for producing a sprung mass low signal; second circuit means responsive to the combination of the stored said inverse of the other one of said two signals of said last produced logic signal pair and said enabling signal for producing a sprung mass high signal; means responsive to said sprung mass low signal for effecting the raising of said sprung mass; means responsive to said sprung mass high signal for effecting the lowering of said sprung mass; third circuit means including reset circuit means effective in response to the presence of said sprung mass low signal to accumulate the time said sprung mass low signal is present for producing a first inhibit signal at the conclusion of a predetermined time period and for applying said first inhibit signal to said first circuit means to effect the disabling of said first circuit means at the conclusion of said predetermined time period; fourth circuit means including reset circuit means effective in response to the presence of said sprung mass high signal to accumulate the time said sprung mass high signal is present for producing a second inhibit signal at the conclusion of a predetermined time period and for applying said second inhibit signal to said second circuit means to inhibit said second circuit means at the conclusion of said predetermined time period; means for effecting the reset of said third circuit means to zero in response to each said sprung mass high signal; and means for effecting the reset of said fourth circuit means to zero in response to each said sprung mass low signal.

3. A motor vehicle level control circuit for use with motor vehicle leveling systems of the type operative to level the sprung mass of the motor vehicle within a predetermined trim band in response to respective electrical signals indicating the sprung mass to be above and below the trim band comprising: an optical switching arrangement of the type including at least one light source connected in a light source electrical energizing circuit and a pair of photosensitive signal generating devices optically coupled to said light source through a movable shuttering arrangement operated by said sprung mass for producing a first logic signal pair when the sprung mass is above the trim band and a second different logic signal pair when the sprung mass is below the trim band; an electrically operable switching device having two current carrying elements connected in series in said light source energizing circuit and a control element; means for producing a series of electrical signal pulses of a predetermined repetition rate and duty cycle and for applying said series of electrical signal pulses to said control element of said switching device in such a manner that said current carrying elements of said switching device are operated to the electrical circuit closed condition only for the duration of each one of said electrical signal pulses to effect the cyclical completion and interruption of said light source energizing circuit whereby the light source energizing circuit current drain on an average basis is reduced by an amount equal to the ratio of the period of interruption to the period of completion; means for preventing a false indication of the position of said sprung mass during those periods of time said light source energizing circuit is interrupted, said means comprising means responsive to said electrical signal pulses for storing a selected one and the inverse of the other one of the two signals of the said logic signal pair last produced during a period of completion of said light source energizing circuit until replaced by said selected one and the said inverse of the other one of the two signals of the next different said logic signal pair produced during a period of completion of said light source energizing circuit; means for producing an enabling signal a predetermined period of time after the production of either one of said first and second logic signal pairs; first circuit means responsive to the combination of the stored said selected one of said two signals of said last produced logic signal pair and said enabling signal for producing a sprung mass low signal; second circuit means responsive to the combination of the stored said inverse of the other one of said two signals of said last produced logic signal pair and said enabling signal for producing a sprung mass high signal; means responsive to said sprung mass low signal for effecting the raising of said sprung mass; and means responsive to said sprung mass high signal for effecting the lowering of said sprung mass.

4. A motor vehicle level control circuit for use with motor vehicle leveling systems of the type operative to level the sprung mass of the motor vehicle within a predetermined trim band in response to respective electrical signals indicating the sprung mass to be above and below the trim band comprising: an optical switching arrangement of the type including at least one light source connected in a light source electrical energizing circuit and a pair of photosensitive signal generating devices optically coupled to said light source through a movable shuttering arrangement operated by said sprung mass for producing a first logic signal pair when the sprung mass is above the trim band and a second different logic signal pair when the sprung mass is below the trim band; an electrically operable switching device having two current carrying elements connected in series in said light source energizing circuit and a control element; means for producing a series of electrical signal pulses of a predetermined repetition rate and duty cycle and for applying said series of electrical signal pulses to said control element of said switching device in such a manner that said current carrying elements of said switching device are operated to the electrical circuit closed condition only for the duration of each one of said electrical signal pulses to effect the cyclical completion and interruption of said light source energizing circuit whereby the light source energizing circuit current drain on an average basis is reduced by an amount equal to the ratio of the period of interruption to the period of completion; means for preventing a false indication of the position of said sprung mass during those periods of time said light source energizing circuit is interrupted, said means comprising means responsive to said electrical signal pulses for storing a selected one and the inverse of the other one of the two signals of the said logic signal pair last produced during a period of completion of said light source energizing circuit until replaced by said selected one and the said inverse of the other one of the two signals of the next different said logic signal pair produced during a period of completion of said light source energizing circuit; means for producing an enabling signal a predetermined period of time after the production of either one of said first and second logic signal pairs; first circuit means responsive to the combination of the stored said selected one of said two signals of said last produced logic signal pair and said enabling signal for producing a sprung mass low signal; second circuit means responsive to the combination of the stored said inverse of the other one of said two signals of said last produced logic signal pair and said enabling signal for producing a sprung mass high signal; means responsive to said sprung mass low signal for effecting the raising of said sprung mass; means responsive to said sprung mass high signal for effecting the lowering of said sprung mass; third circuit means including reset circuit means effective in response to the presence of said sprung mass low signal to accumulate the time said sprung mass low signal is present for producing a first inhibit signal at the conclusion of a predetermined time period and for applying said first inhibit signal to said first circuit means to effect the disabling of said first circuit means at the conclusion of said predetermined time period; fourth circuit means including reset circuit means effective in response to the presence of said sprung mass high signal to accumulate the time said sprung mass high signal is present for producing a second inhibit signal at the conclusion of a predetermined time period and for applying said second inhibit signal to said second circuit means to inhibit said second circuit means at the conclusion of said predetermined time period; means for effecting the reset of said third circuit means to zero in response to each said sprung mass high signal; and means for effecting the reset of said fourth circuit means to zero in response to each said sprung mass low signal.

* * * * *